US006789592B2

(12) United States Patent
Biro et al.

(10) Patent No.: US 6,789,592 B2
(45) Date of Patent: Sep. 14, 2004

(54) APPARATUS AND METHOD FOR GUIDING THE SEAM ALLOWANCE IN SEAM SEALING

(75) Inventors: Andrea Biro, Newark, DE (US); D. Scott Wolf, Lancaster, PA (US)

(73) Assignee: Gore Enterprise Holdings, Inc., Newark, DE (US)

(*) Notice: Subject to any disclaimer, the term of this patent is extended or adjusted under 35 U.S.C. 154(b) by 0 days.

(21) Appl. No.: 10/274,341

(22) Filed: Oct. 18, 2002

(65) Prior Publication Data
US 2004/0074597 A1 Apr. 22, 2004

(51) Int. Cl.[7] .......................... B32B 31/00; D05B 35/10
(52) U.S. Cl. ........................ 156/391; 156/494; 156/538
(58) Field of Search .............................. 156/304.3, 391, 156/494, 495, 497, 499, 538, 539, 556

(56) References Cited

U.S. PATENT DOCUMENTS

| 3,530,027 | A | * | 9/1970 | Malicote, Jr. ................ 156/582 |
| 4,608,114 | A | | 8/1986 | Nakao |
| 5,390,594 | A | * | 2/1995 | Nobile et al. .................. 101/92 |
| 5,394,813 | A | * | 3/1995 | Shimoyama et al. .. 112/470.31 |
| 5,662,767 | A | * | 9/1997 | Getz et al. ................... 156/498 |
| 5,675,495 | A | | 10/1997 | Biermann |
| 5,743,202 | A | | 4/1998 | Price |
| 5,908,004 | A | | 6/1999 | Porter |
| 5,941,187 | A | | 8/1999 | Rouleau |
| 6,032,714 | A | | 3/2000 | Fenton |
| 6,129,809 | A | | 10/2000 | Ellenberger |
| 6,554,947 | B2 | * | 4/2003 | Pfotenhauer et al. ..... 156/304.1 |
| 2003/0010439 | A1 | * | 1/2003 | Fenton ..................... 156/304.3 |

FOREIGN PATENT DOCUMENTS

| GB | 2 305 391 A | 4/1997 | |
| JP | 03139389 A | * 6/1991 | ........... D05B/35/10 |

* cited by examiner

Primary Examiner—Sue A. Purvis
(74) Attorney, Agent, or Firm—Kevin J. Boland

(57) ABSTRACT

Apparatus and a method are provided for guiding the seam allowance of a seamed joint of a fabric into alignment longitudinally with a seam sealing tape applied to the seamed joint within a consolidation nip, all to effect a leakproof seal of the joint. The apparatus includes guide means positioned proximate the consolidation nip, adjacent the entrance thereof, the guide means having an opening therein to and through which the seam allowance is passed. The opening is of a size sufficient to accept and guide the seam allowance passing therethrough. The opening is preferably a slot, the open end of the slot being positioned adjacent the seamed joint and aligned with the tape as the tape and joint pass to and through the consolidation nip. The guide means optionally includes coacting shock absorbers. On passage of the seamed joint and seam sealing tape through the consolidation nip, and being consolidated thereat, a sealed, seamed joint is provided such that the joint seam is aligned longitudinally along the tape. The preferred guide slot extends from its open end oriented at an angle upwardly from the plane of the fabric. Any suitable sealing tape may be employed.

31 Claims, 5 Drawing Sheets

APPARATUS AND METHOD FOR GUIDING THE SEAM ALLOWANCE IN SEAM SEALING

BACKGROUND OF THE INVENTION

1. Field of the Invention

This invention relates to a process and apparatus for sealing seams in fabrics, such as protective barrier fabrics found in waterproof garments and the like, to preserve the imperviousness of such fabrics at the seamed joints thereof, at which joints intersecting panels or sections of fabric are joined together, such as by stitching, gluing or welding. The stitching (or poor gluing or welding) creates holes and/or gaps through the garments at such joints, which holes or gaps must be sealed if the integrity of the garment as a fluid barrier throughout its construction is to be maintained.

2. Description of Related Art

Sealing of seams in protective garments and the like, at the stitched joints where intersecting panels of cloth are joined together, is known. At such stitched joints, the respective fabric panels are generally not overlapping, but are butted together to form an extension extending substantially perpendicularly from the plane of the fabric panels, with the stitches at the base thereof. This extension is termed the "seam allowance".

Typically a tape of material, which may or may not be of the same material as the protective barrier fabric, is affixed to the garment overlaying and sealing the seam(s) along each joint of the garment. Tapes may be thermoplastic materials, with sealing over a joint effected by thermal means such as a hot air gun which softens/melts the tape to a tacky state and seals the joint upon application. In addition, backing tapes having adhesives applied thereto are also employed. Known adhesives include thermoplastic and hot-melt urethane adhesives, certain glues, and, more recently, silicone adhesives have been disclosed which are suitable for this purpose.

Protective items which employ seam seals include waterproof garments such as rainwear and tents for outdoor activities. Operating room gowns are sealed to protect the wearer from blood borne pathogens and other body fluids. Firemen's coats must offer complete protection from a variety of possible penetrants, including water, pathogens and a wide range of various chemicals which could be encountered in any given fire emergency situation.

Seam seals also often must withstand hostile environmental conditions. For example, firefighters' turnout gear, including the seams, must withstand high temperatures without melting. In seams in surgical protective garments, it is desirable that the seals be autoclave-sterilized numerous times, while retaining their barrier properties.

Generally, protective garments can be made to include a special protective barrier layer and other coverings or carrier layers, such as backings or facing fabrics. In these garments, the protective barrier layer protects the wearer from a threat to well being, such as rain, snow, chemicals, viruses or blood pathogens. Examples of such barrier layers include microporous polytetrafluoroethylene membranes, microporous or monolithic polyurethane membranes, and polyetherpolyester membranes. The protective barrier layers may be attached to or laminated to one or more layers of an abrasion resistant, high strength backing, usually a woven or knit fabric layer, to form a composite protective barrier fabric. Nylon and polyester are examples of backing fabrics used in these constructions.

Garments may be assembled from these fabrics by sewing panels of the protective barrier fabric into the desired garment shape. Joints between the panels and other disruptions of the barrier layer must be sealed to provide a barrier which functions comparably to the protective barrier fabric itself. This generally is accomplished by applying a sealing tape over the seam, as discussed above.

The process of seam sealing of protective barrier garments generally includes consolidating the sealing tape over the joint in a consolidation nip. The nip may include opposing rollers.

U.S. Pat. No. 6,032,714 and the references cited therein disclose various processes and apparatus used in seam sealing, and are illustrative of the present state of this art. In known seam sealing techniques, it is difficult to lay the sealing tape onto the seamed joint such that the seam lies precisely along the centerline of the tape. As the seam allowance folds over during passage through the consolidation nip, it can interfere with the delicate application of the tape to the joint. An unguided seam allowance can flip-flop along the joint, overlapping the joint on one side of the seam and then the other, resulting in a wandering of the seam itself with respect to the centerline of the applied sealing tape, and vice versa. Top stitching, gluing or welding the seam allowance to one side before seam sealing can prevent this flip-flop. However, as seam tapes become narrower, the seam allowance also becomes narrower, making top stitching more difficult and more time consuming. For narrower seam tapes, it is desirable to keep the seam allowance (either top stitched or not top stitched) centered along the center of the seam sealing tape.

In contrast to the known prior art, the present invention provides a process and apparatus for guiding the seam allowance of a seamed joint in a fabric into alignment longitudinally with a seam sealing tape applied to the seam. The result is a sealed, seamed joint such that the seam is aligned longitudinally with the sealing tape.

SUMMARY OF THE INVENTION

Apparatus is provided for guiding the seam allowance of a seamed joint of a fabric into alignment longitudinally with a seam sealing tape applied to the seamed joint within a consolidation nip. The apparatus includes a guide positioned proximate the consolidation nip, adjacent the entrance thereof, the guide having an opening therein to and through which the seam allowance is passed. The opening is of a size sufficient to accept and guide the seam allowance passing therethrough, the opening being positioned adjacent the seamed joint and aligned with the tape as the tape and joint pass to and through the consolidation nip. In preferred embodiments, the fabric is a protective barrier fabric, and the opening is a slot. The guide optionally and preferably is affixed to shock absorbers coacting with the guide. In operation, on passage of the seamed joint and seam sealing tape through the consolidation nip, and being consolidated thereat, a sealed, seamed joint is provided such that the joint seam is aligned longitudinally along the tape. In one embodiment, the seam is aligned along the centerline of the tape. The guide slot preferably extends from its open end oriented at an angle upwardly from the plane of the fabric, the angle preferably being between 30° and 150°, with the most preferred angle being 45°. The optional shock absorbers may be a spring-loaded shock absorbing support frame affixed adjacent the nip, on which the guide is mounted.

The guide means may be permanently mounted to the frame (e.g., welded) or it may be removably mounted (e.g., bolted, clipped, etc.) Thereto. The guide means may be rotatably mounted to the frame to allow for the easy changing of the slot angle, for example, rotation from 30° to 150°, by simply rotating the guide means.

In a preferred embodiment, the seam sealing tape is a thermoplastic tape, with sealing effected by thermal means, such as a hot air stream. Alternatively, the seam sealing tape may be a backing tape having an adhesive applied thereto. A preferred adhesive is a silicone adhesive. Any other suitable sealing tape may be employed.

The width of the seam sealing tape may vary according to the height of the seam allowance. The seam sealing tape generally has a width of less than about 25 mm, preferably less than about 17 mm, and more preferably less than 15 mm, and most preferably is no greater than 13 mm in width. The height of the seam allowance preferably is less than 6 mm, more preferably less than 3 mm and most preferably is no greater than 2 mm.

In addition, a process for applying seam sealing tape to a seamed joint of a protective barrier fabric to effect a seal of the joint, using the aforesaid apparatus, is provided.

DETAILED DESCRIPTION OF THE INVENTION AND PREFERRED EMBODIMENTS WITH REFERENCE TO THE DRAWINGS

Apparatus and a method are provided for guiding the seam allowance of a seamed joint of a fabric into alignment longitudinally with a seam sealing tape applied to the seamed joint within a consolidation nip, all to effect a leakproof seal of the joint. The apparatus includes guide means positioned proximate the consolidation nip, adjacent the entrance thereof, to and through which the seam allowance is passed. The guide has an opening therein of a size sufficient to accept and guide the seam allowance passing therethrough, the opening being positioned adjacent the seamed joint and aligned with the tape as the tape and joint pass to and through the consolidation nip. The opening is preferably a slot. The term "slot" may include grooves and other openings such as those depicted in the accompanying drawings.

The guide means may include coacting shock absorbers.

On passage of the seamed joint and seam sealing tape through the consolidation nip, and being consolidated thereat, a sealed, seamed joint is provided such that the joint seam is aligned longitudinally along the tape. The preferred guide slot extends from its open end oriented at an angle upwardly from the plane of the fabric. The slot urges the seam allowance to one side of the garment and is positioned such that the mid-point of the seam allowance, that is, the point half-way between the joint seam and the distal edge of the seam allowance, is oriented longitudinally substantially along the centerline of the tape, i.e., the tape and seam allowance are commonly centered. This slot angle is preferably between 30° and 150°, with the most preferred angle being 45°. Thermoplastic tape, backing tape having adhesive applied thereto, or any other suitable sealing tape may be employed. Preferably the seam sealing tape has a width no greater than 13 mm.

Figure 1:
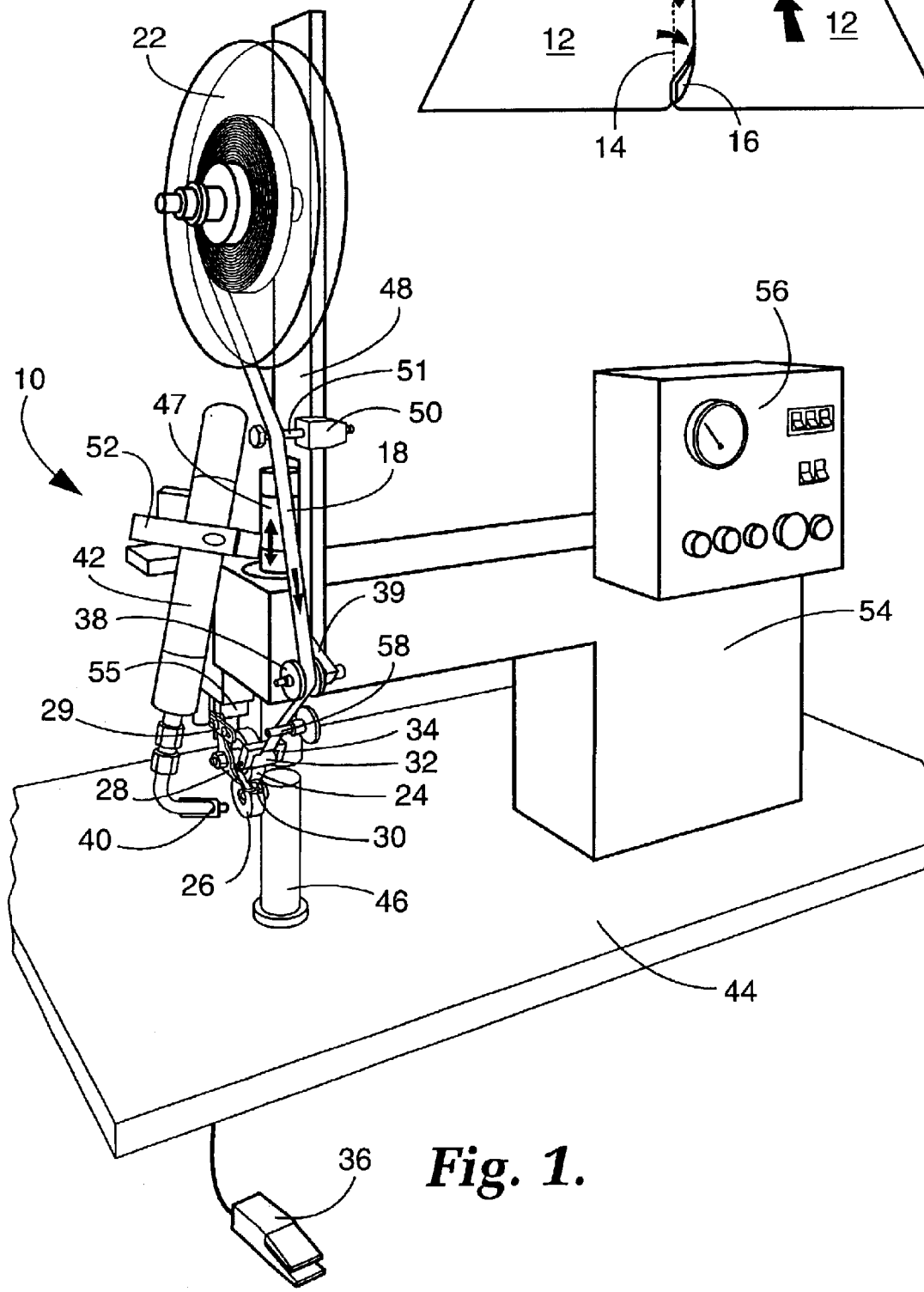
FIG. 1 is an overall, perspective view of the apparatus and process according to the invention, wherein the jointed fabric panels to be sealed have been omitted for clarity of illustration of the apparatus.

A detailed description of the invention and preferred embodiments is best provided with reference to the accompanying drawings, wherein FIG. 1 illustrates, in perspective, all of the various components of the apparatus 10 used to guide the seam allowance in a seamed joint to effect alignment of the seam with a joint sealing tape. A fabric whose seams are to be sealed is omitted from FIG. 1 for clarity of illustration.

In the figure, the apparatus 10 includes tape supply roll 22 mounted upon support bracket 48 from which backing tape 18 is withdrawn. The tape 18 is guided over pin 51 and idler roll 38, under tape guide 34 and over guide roll 32, to the nip between the upper consolidation nip roller 24 and the opposing, lower roll 26. The assembly of the upper roller 24 and tape guides 32 and 34, all as a unit termed herein the "quill", is adjustable in space as indicated by the double-headed arrow, affixed to and actuated by the actuator 47, the position during operation being set by the operator by a stop block incorporated into actuator 47. This upper assembly may be lowered according to predetermined settings to enable the roller 24 to be positioned with respect to roll 26 to a preset, desired spacing to effect advancement of the tape 18 and workpiece being fed into the nip between rolls 24 and 26.

With reference to FIG. 1, in the process of the invention, a seam sealing tape 18 is fed in the direction indicated by the arrow from a supply roll 22 thereof, over guide pin 51 held by bracket 50 to fixed support arm 48, thence over idler roller 38 and guide pin 58 and into and through tape guide 34. From the guide 34, the tape is fed over roll 32 into the consolidation nip between the upper roll 24 and the lower roll 26, where it is consolidated with the jointed fabric, not shown in FIG. 1.

Affixed to the quill assembly is a support frame 28 to which is affixed, either permanently or removably, the seam allowance guide 30 of the invention. This assembly may include optional shock absorbing means described more fully below.

The drive mechanism to drive the rollers 24, 26 is geared through actuator 47 and main support housing 54, having control console 56 which houses the drive controls and heating controls. When a thermoplastic sealing tape 18 is employed, a hot air gun 40 as illustrated may be used to heat the tape 18 within the nip between the rolls 24 and 26 to soften the tape 18 and render it tacky. Heated air supply 42 is mounted to support frame 54 by support bracket 52 and the nozzle of gun 40 directs the heated air into the consolidation nip and to the tape on demand.

For completeness, all of the above apparatus is depicted as mounted on work support surface 44. The pillar 46 provides a partial support for a jointed fabric workpiece being fed into the nip between rollers 24 and 26.

Figure 2:
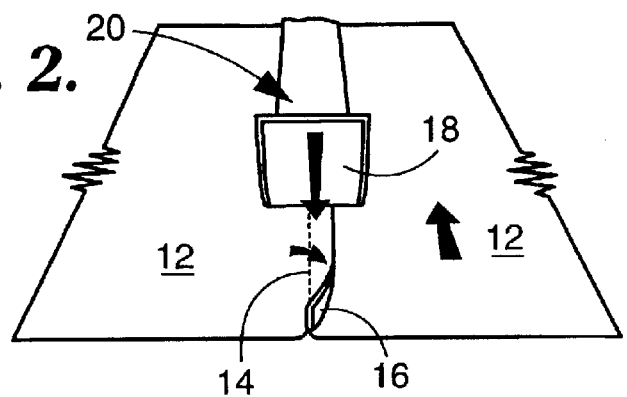
FIG. 2 is a perspective view of the jointed fabric panels being sealed at their seam by a sealing tape being laid thereover, the seam allowance being simultaneously folded over under the tape.

A perspective view of a jointed workpiece as it passes through the sealing process is shown schematically in FIG. 2. Therein two fabric panels 12, 12, which are joined (e.g., sewn, glued, welded) together at seam 14, and wherein the extensions of each fabric 12 beyond the seam 14 butt together to form the seam allowance 16, are overlaid along the seam by sealing tape 18. The direction of passage of the fabric panels 12, 12 and the tape 18 is indicated by the bold arrows. As the sealing tape 18 is applied, the seam allowance 16 folds over onto one of the fabric panels 12, as indicated by the curved arrow in FIG. 2, the tape 18 is applied thereover, and a finished, sealed seam 20 is produced.

While a thermoplastic sealing tape has been described in connection with FIGS. 1 and 2, it will be clear to one skilled in the art that other types of sealing tape may be employed, such as tapes having applied adhesive thereon, or tapes in which an adhesive is applied to a backing material within the consolidation nip. The invention is not limited to particular types of sealing tapes, and will be effective whenever the need arises to guide a seam allowance 16 into alignment with a sealing tape 18 in a seam sealing operation.

Figure 3:
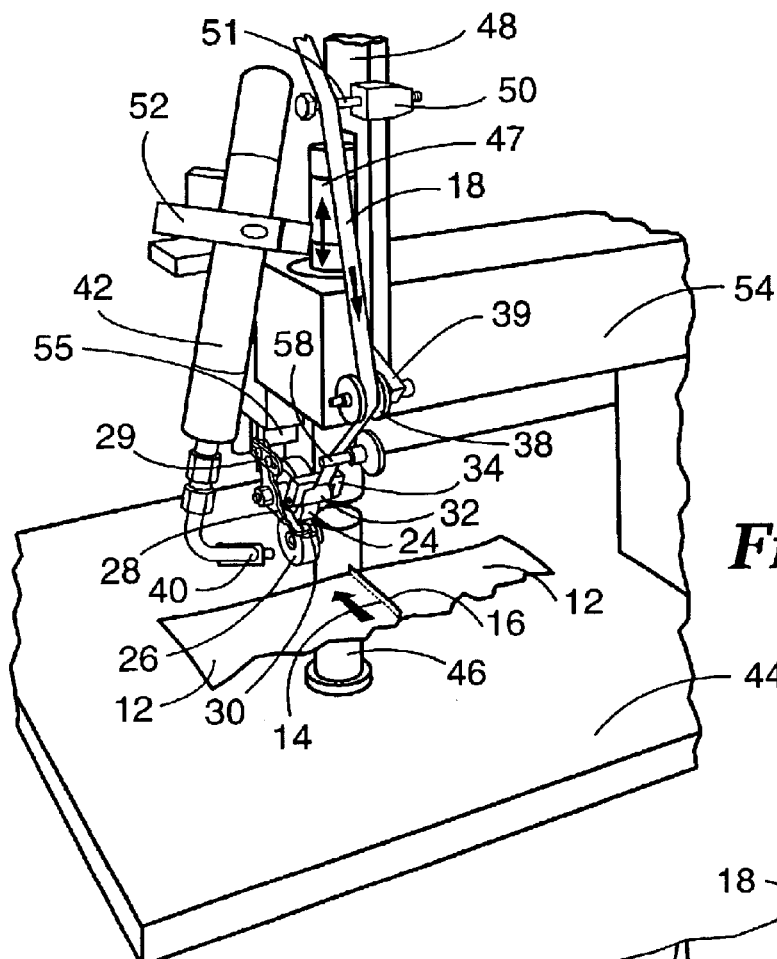
FIG. 3 is a perspective view of the seam allowance guide means according to the invention.
Figure 4:
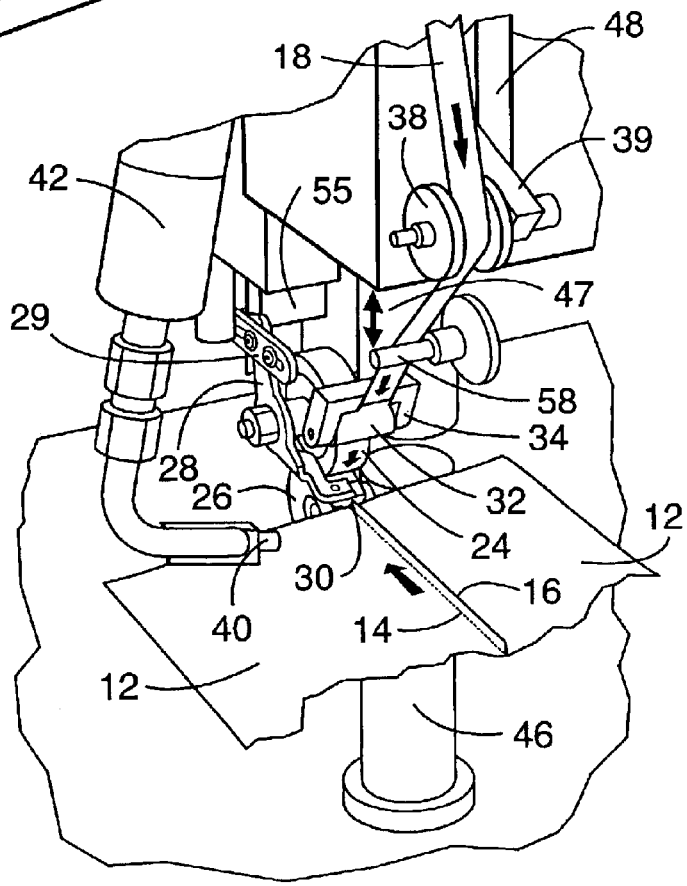
FIG. 4 is a further magnified, perspective view of the cooperating seam allowance guide and shock absorbers of the invention, shown as a jointed fabric panel enters therein.

A detailed view of the seam allowance guide apparatus and including a jointed fabric seam to be sealed is shown in FIG. 3. Therein, the seam allowance 16 between fabric panels 12, 12 is shown being directed into the nip between upper roll 24 and lower roll 26. The direction of feed of the seamed joint is indicated by the bold arrow. Simultaneously, a sealing tape 18 is fed into the consolidation nip and guided to cover the seam 14 and seam allowance 16. FIG. 4 shows a further magnified view of the apparatus of the invention just prior to entry of the seam allowance 16 into the guide means 30. Again, the direction of advancement of the fabric joint 14 and sealing tape 18 is indicated by the bold arrows. The seam allowance guide means 30 is shown affixed to the support frame 28 which, in turn, is adjustably affixed to bracket mount 55 by means of slotted attachment bracket 29. Frame 28 is bolted to upper roller 24 as shown. Not seen in FIG. 4 is an optional shock absorbing spring mounted between frame 28 and bracket 29, which is described below and which effectively absorbs shocks encountered on passage of the seamed joint through the seam allowance guide means 30.

Figure 5:
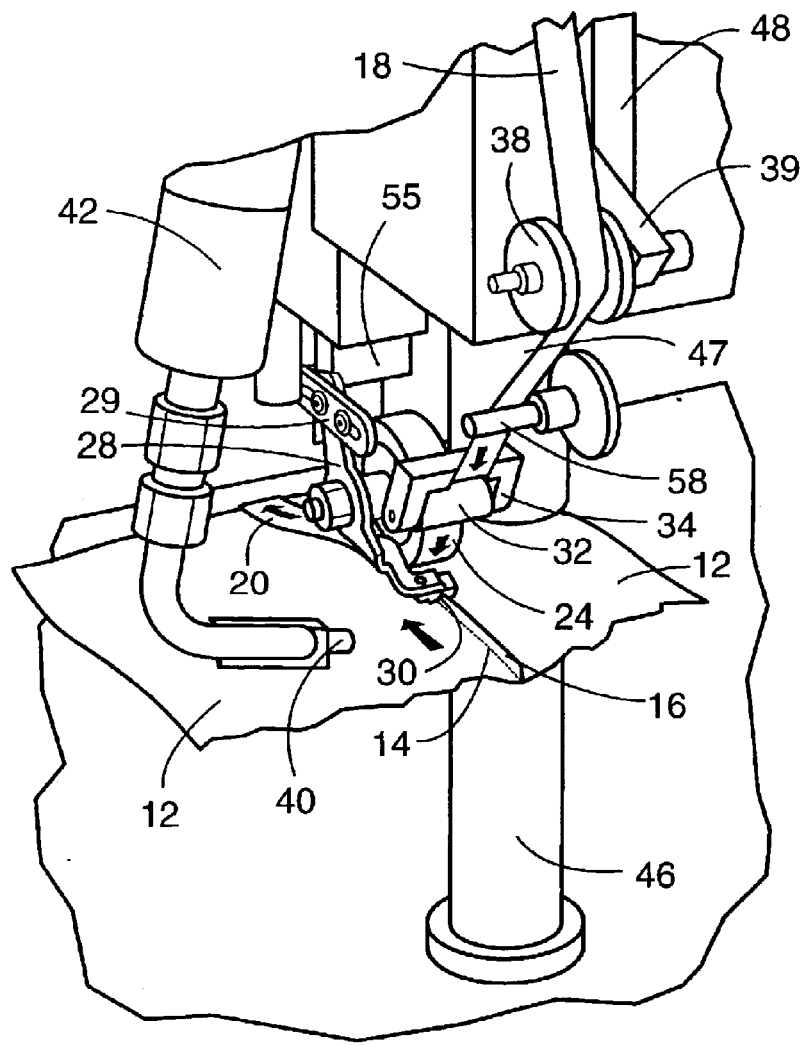
FIG. 5 illustrates, in perspective, a jointed fabric passing through the apparatus of the invention and emerging therefrom having a sealed, seamed joint.

FIG. 5 depicts the apparatus of the invention wherein the seamed joint has partially passed through the seam sealing process and a sealed joint 20 is produced. All other components in FIGS. 3, 4 and 5 are as discussed hereinabove. Seam allowance guide means 30, in a preferred embodiment, is depicted.

Figure 6:
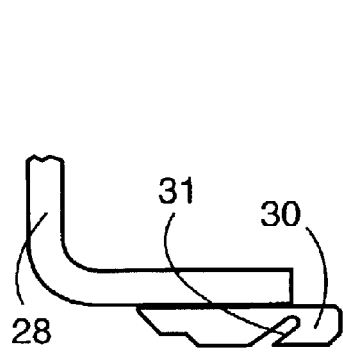
FIGS. 6, 6A and 6B show front elevations of preferred configurations of guide slots used in the guide means of the invention.

FIG. 6 shows one embodiment of the preferred seam allowance guide means 30 of the invention. In general, the guide means 30 is affixed to support frame 28. In this preferred embodiment, guide means 30, also shown in FIG. 5, has guide slot 31 machined therein, through which slot the seam allowance 16 is guided during the sealing process. Slot 31 in guide 30 is angled at approximately 45° to the plane of the jointed fabric passing therethrough. The slot 31 forces the seam allowance 16 passing therethrough to fold over, upon which the tape 18 is overlaid, while simultaneously creating (forcing) longitudinal alignment between the joint seam 14 and tape 18. The leading edge of slot 31 can be slightly rounded to ease passage of the seam allowance into slot 31.

Figure 6A:
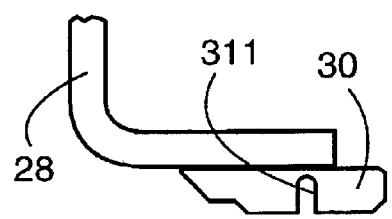
Figure 6B:
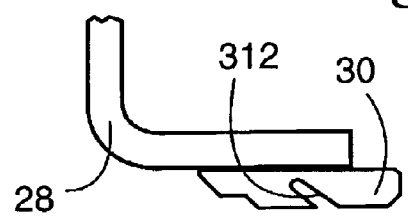

FIGS. 6A and 6B show alternate embodiments of guide 30, wherein guide 30 has slots 311 and 312 angled at 90° and 135°, respectively, to the plane of the fabric in the construction passing through the consolidation nip.

While specific angles of the slot are depicted, these should not be limiting in any respect. Angles between 30° and 150° are effective in joint sealing according to the principles underlying the present invention.

Figure 6C:
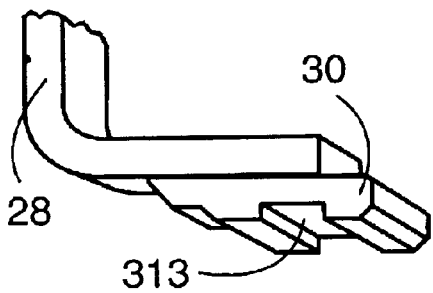
FIGS. 6C through 6H are perspective views of guide means each having alternate configurations of openings therein, all within the scope of the invention.
Figure 6D:
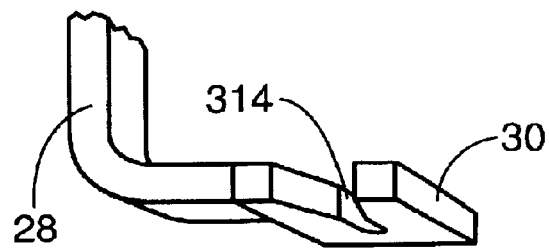
Figure 6E:
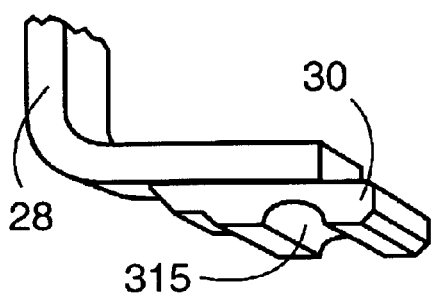
Figure 6F:
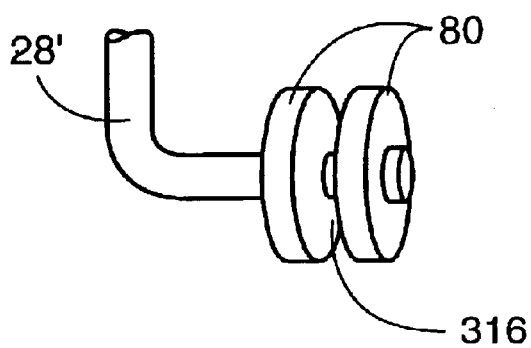
Figure 6G:
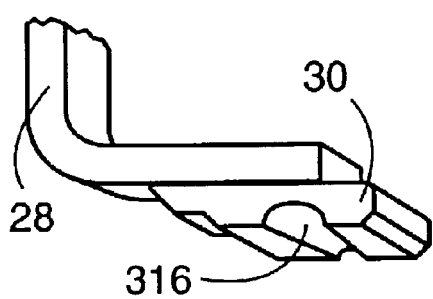
Figure 6H:
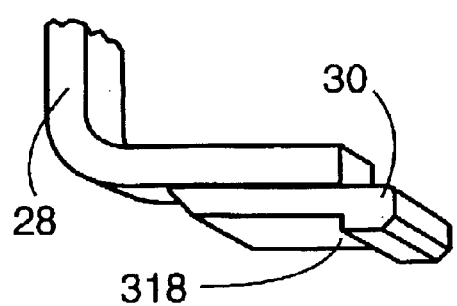

FIGS. 6C through 6H depict alternate embodiments of guide means 30 having various acceptable opening configurations. In FIG. 6C, the opening 313 is rectangular, and in FIG. 6D through FIG. 6H, the openings 314 through 318, respectively, are a tapered slot, a semicircular groove, formed as a gap between two cooperating rollers 80, a tapered, semicircular slot, and an inverted "L" bracket. Note in FIG. 6F that the rollers 80 are mounted on a common axle 28'.

Figure 7:
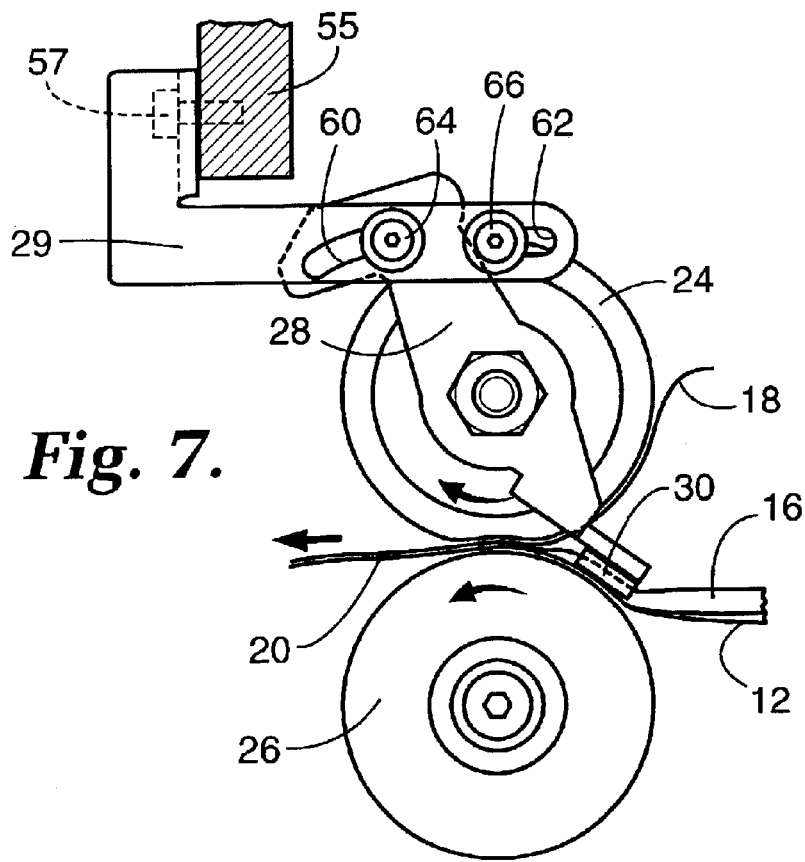
FIG. 7 is a left side elevation of the guide means and the shock absorbing means of the invention affixed proximate the consolidation nip rolls.
Figure 8:
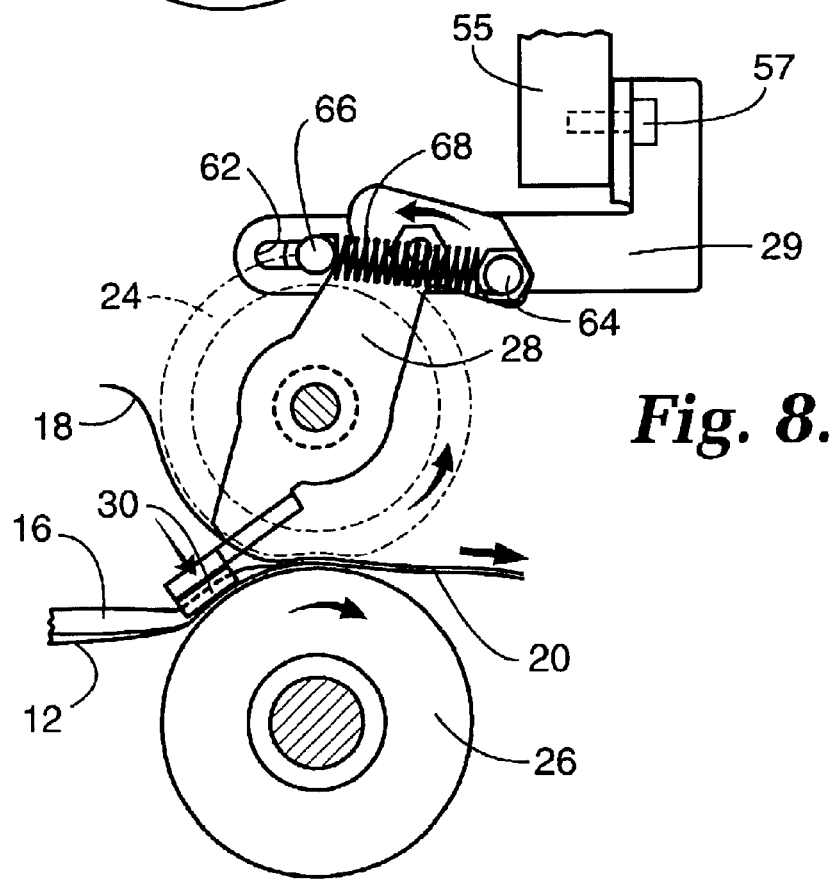
FIG. 8 is a right side elevational view of the guide means and shock absorbing means shown in FIG. 7.

FIGS. 7 and 8 depict left side and right side elevations, respectively, of a jointed fabric panel 12 having seam allowance 16 passing through the nip between upper roll 24 and lower roll 26, guided through guide 30, all resulting in seamed joint 20 emerging from the rollers. In cooperation with guide 30 is shock absorbing apparatus such as that depicted wherein the guide 30 is mounted on frame 28 rotatably mounted to upper roll 24 and bolted to slotted frame 29 by bolt means 64. Frame 29 has slots 60 and 62 therein which receive adjustable and positionable bolts 64 and 66. A spring 68, seen in FIG. 8, is mounted between bolt 64 and bolt 66, these bolts fixed and tightened at desired locations in slots 60 and 62 to thereby adjust the tension in spring 68 which, in turn, applies a positive, adjustable compressive force between guide 30 and the seamed joint passing therethrough, as indicated by the arrow shown in FIG. 8. This shock absorbing apparatus absorbs shocks encountered by a fabric joint passing through guide 30 and effectively dampens or eliminates their adverse effects in the sealing process.

The process and apparatus of the invention have many advantages. For example, garments produced are exceptionally attractive due to the ability to consistently lay down the seam allowance to one side of the seam. Flip-flopping of the seam allowance from one side of the seam to the other can be eliminated resulting in a much more aesthetically pleasing garment. It is possible to produce garments more economically, having a smaller seam allowance, and using a more narrow seam sealing tape resulting in a garment which is lighter, due to the reduction in fabric and tape used, and more quickly and reliably produced. The ability to seal tighter curvature seams is greatly improved.

While materials of construction of the various components according to the invention are not critical, and should be known to those skilled in the art, the frame 28 and seam guide 30 depicted herein are preferably made of steel.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. In a fabric seam sealing apparatus for applying seam sealing tape to the seam allowance of a seamed joint of a fabric, wherein the seamed joint is sealed by said tape during passage of said seamed joint and tape through a consolidation nip, the improvement comprising:

seam allowance guide means having an opening therein, said seam allowance guide means positioned proximate said consolidation nip, adjacent the entrance thereof, with said opening positioned adjacent said joint and aligned with said tape, said opening being of a size and shape sufficient to receive and guide said seam allowance passing therethrough into longitudinal alignment with said tape.

2. The apparatus of claim 1 wherein said fabric is a protective barrier fabric.

3. The apparatus of claim 1 wherein said opening is a slot, the open end of said slot being positioned adjacent said seamed joint as the tape and joint pass to and through said consolidation nip.

4. The apparatus of claim 1 including shock absorbing means affixed to and co-acting with said guide means.

5. The apparatus of claim 3 wherein said slot extended from its said open end oriented at an angle upwardly from the plane of said fabric.

6. The apparatus of claim 5 wherein said angle is approximately 45.

7. The apparatus of claim 5 wherein said angle is approximately 90.

8. The apparatus of claim 5 wherein said angle is approximately 135.

9. The apparatus of claim 5 wherein said angle is between 30 and 150.

10. The apparatus of claim 1 wherein said guide means is positioned such that the seamed joint is oriented longitudinally substantially along the centerline of said tape.

11. The apparatus of claim 1 wherein said guide means is positioned such that the seam allowance is substantially centered longitudinally along the tape.

12. The apparatus of claim 4 wherein said shock absorbing means comprises a spring-loaded shock absorbing support frame affixed adjacent said nip and on which is mounted said guide means.

13. The apparatus of claim 1 wherein said seam sealing tape is thermoplastic tape and sealing is effected by thermal means.

14. The apparatus of claim 13 wherein said thermal means is a hot air stream.

15. The apparatus of claim 1 wherein said seam sealing tape comprises a backing tape having an adhesive applied thereto on passage to and through said consolidation nip.

16. The apparatus of claim 15 wherein said adhesive is a silicone adhesive.

17. The apparatus of claim 1 wherein said seam sealing tape has a width of less than about 25 mm.

18. The apparatus of claim 17 wherein the width of said tape is less than about 17 mm.

19. The apparatus of claim 17 wherein the width of said tape is less than about 15 mm.

20. The apparatus of claim 17 wherein the width of said tape is no greater than 13 mm.

21. The apparatus of claim 1 wherein the height of said seam allowance is no greater than about 6 mm.

22. The apparatus of claim 21 wherein the height of said seam allowance is no greater than 3 mm.

23. The apparatus of claim 21 wherein the height of said seam allowance is no greater than 2 mm.

24. The apparatus of claim 1 wherein said opening has a rectangular cross-section.

25. The apparatus of claim 1 wherein said opening is a tapered slot.

26. The apparatus of claim 1 wherein said opening has a semi-circular cross-section.

27. The apparatus of claim 1 wherein said opening is formed as a gap between two cooperating rollers mounted upon an axle.

28. The apparatus of claim 1 wherein said opening has a tapered semi-circular cross-section.

29. The apparatus of claim 1 wherein said opening is formed as an inverted "L" bracket.

30. The apparatus of claim 1 wherein the seam allowance guide means is rotatably mounted to the apparatus.

31. Apparatus for guiding the seam allowance of a seamed joint of a fabric into longitudinal alignment with a seam sealing tape applied to said seamed joint, wherein the seamed joint is sealed by said tape during passage of said seamed joint and tape through a consolidation nip, said apparatus comprising:

guide means having an opening therein, said guide means positioned proximate said consolidation nip, adjacent the entrance thereof, with said opening positioned adjacent said joint and aligned with said tape, said opening being of a size and shape sufficient to receive and guide said seam allowance passing therethrough into longitudinal alignment with said tape, wherein said opening is a slot, the open end of said slot being positioned adjacent said seamed joint as the tape and joint pass to and through said consolidation nip, wherein said slot extends from its said open end oriented at an angle upwardly approximately 45° from the plane of said fabric, the apparatus including shock absorbing means affixed to and co-acting with said guide means, wherein said shock absorbing means comprises a spring-loaded shock absorbing support frame affixed adjacent said nip and on which is mounted said guide means.

* * * * *